United States Patent
Gonla et al.

(10) Patent No.: US 8,442,801 B2
(45) Date of Patent: May 14, 2013

(54) WIRELESS LOCATION-BASED SYSTEM FOR DETECTING HAZARDOUS CONDITIONS

(75) Inventors: Patrick S. Gonla, Maplewood, MN (US); Soumitri Kolavennu, Blaine, MN (US); Cleopatra Cabuz, Eden Prairie, MN (US)

(73) Assignee: Honeywell International Inc., Morristown, NJ (US)

( * ) Notice: Subject to any disclaimer, the term of this patent is extended or adjusted under 35 U.S.C. 154(b) by 245 days.

(21) Appl. No.: 12/959,250

(22) Filed: Dec. 2, 2010

(65) Prior Publication Data

US 2011/0161044 A1 Jun. 30, 2011

Related U.S. Application Data

(63) Continuation-in-part of application No. 12/695,736, filed on Jan. 28, 2010.

(60) Provisional application No. 61/290,262, filed on Dec. 28, 2009.

(51) Int. Cl.
*G01C 9/00* (2006.01)

(52) U.S. Cl.
USPC ............. 702/150; 702/23; 702/24; 702/94

(58) Field of Classification Search .............. 702/127, 702/150, 152, 189
See application file for complete search history.

(56) References Cited

U.S. PATENT DOCUMENTS

| | | | |
|---|---|---|---|
| 7,345,582 B2 * | 3/2008 | Gould | 340/539.26 |
| 7,522,043 B2 * | 4/2009 | English et al. | 340/545.6 |
| 7,609,159 B2 * | 10/2009 | Benson et al. | 340/540 |
| 7,904,244 B2 * | 3/2011 | Sugla | 701/300 |
| 7,994,926 B2 * | 8/2011 | Longman et al. | 340/600 |
| 8,099,130 B1 * | 1/2012 | Halla et al. | 455/561 |
| 2004/0149918 A1* | 8/2004 | Craig et al. | 250/370.01 |
| 2005/0057370 A1* | 3/2005 | Warrior et al. | 340/870.01 |
| 2008/0168826 A1 | 7/2008 | Saidi et al. | |
| 2009/0212995 A1 | 8/2009 | Wu et al. | |
| 2011/0161885 A1 | 6/2011 | Gonia et al. | |

OTHER PUBLICATIONS

European Search Report, dated May 8, 2012, corresponding to Application No. EP 11 19 1449.
Junjie Chen et al., A Weighted Compensated Localization Algorithm of Nodes in Wireless Sensor Networks, Third International Workshop on Advanced Computational Intelligence, Aug. 26-27, 2010, pp. 379-384, Suzhou, Jiangsu, China.
Elisabetta Farella et al, Aware and Smart Environments: The Casattenta Project, Microelectronics Journal 41 (2010) pp. 697-702.

* cited by examiner

*Primary Examiner* — Mischita Henson
(74) *Attorney, Agent, or Firm* — Husch Blackwell LLP

(57) ABSTRACT

A method and apparatus are provided for estimating the location of a portable device. The method includes providing a plurality of location anchor and enhanced location anchor transceivers within a region, each operating from respective predetermined locations, a portable transceiver measuring a signal parameter from the transceivers, a location engine determining a location of the portable transceiver based upon the signal measurements and the respective predetermined locations of the transceivers, each of the enhanced transceivers measuring a signal parameter from some of the location and other enhanced transceivers, the location engine calculating an estimated location for each of the plurality of enhanced transceivers and calculating a location error based upon the estimated location and predetermined location of the enhanced location anchor transceiver.

17 Claims, 1 Drawing Sheet

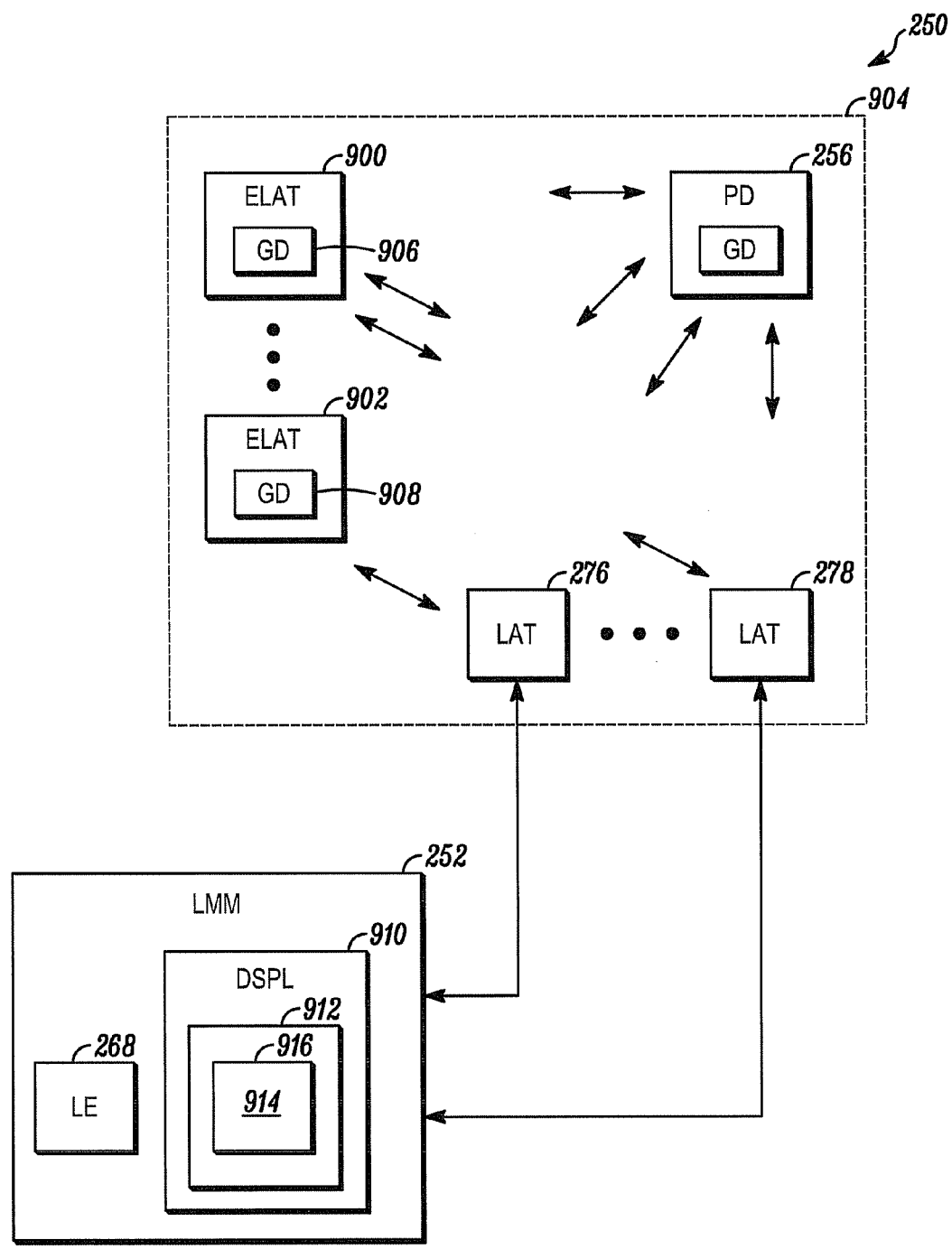

WIRELESS LOCATION-BASED SYSTEM FOR DETECTING HAZARDOUS CONDITIONS

CROSS-REFERENCE TO RELATED APPLICATIONS

This application is related to and claims priority from U.S. Provisional Patent Application No. 61/290,262 filed on Dec. 28, 2009, entitled "Wireless Location-Based System and Method for Detecting Hazardous and Non-Hazardous Conditions" and to U.S. Non-provisional patent application Ser. No. 12/695,736, filed on Jan. 28, 2010 and entitled "Wireless Location-Based System and Method for Detecting Hazardous and Non-Hazardous Conditions", which claims priority from U.S. Provisional Patent Application No. 61/290,262, the contents of which are both incorporated herein by reference in their entirety.

FIELD OF THE INVENTION

The field of the invention relates to sensing devices and more particularly to portable gas detectors.

BACKGROUND OF THE INVENTION

In many environments, it is desirable to detect accumulations of potentially hazardous gases before a hazardous situation exists. An industrial plant, for example, may deploy a gas detection system including gas sensors distributed throughout the plant. Such a system may also include one or more central stations, which receive signals from the gas sensors. If one of the gas detectors detects an excessive amount of hazardous gas, for example, then an alarm condition is triggered at the central station. Such gas detection systems may further alert an operator so that an action may be taken to preclude a potentially harmful result within the plant.

While such systems are effective in fixed locations, such as when located near industrial equipment in an industrial plant, these types of systems are not portable or adaptable to changing conditions. Additionally, such conventional gas detection systems typically do not provide quick centralized access to information regarding gas detection events, including the location of the event(s) and location-based gas detection historical information. Further, if the conventional system does provide centralized access, expensive wiring is required to connect the gas detectors to the central station.

In some prior art gas detection systems, a personal belt-worn device may be utilized for detecting gas concentrations within a particular location. Such gas detectors may provide information regarding the state of the gas concentration as a function of time. A central station operator, however, does not have access to location information and the gas concentration information as a function of time is not available until a much later time, when the device's daily log may be transferred to a personal computer.

Based on the foregoing, a need exists for an improved wireless location-based gas detection system and method. A need also exists for wirelessly detecting location information associated with a hazardous gas event along with time information, as described in greater detail herein.

BRIEF DESCRIPTION OF THE DRAWING

FIG. 1 is a block diagram of a environmental sensing system shown generally in accordance with an illustrated embodiment of the invention.

DETAILED DESCRIPTION OF AN ILLUSTRATED EMBODIMENT

FIG. 1 depicts a gas detection system 250 shown generally in accordance with an illustrated embodiment of the invention. Included within the gas detection system 250 may be a number of portable gas detectors (transceivers) 256. Also included within the gas detection system 250 is a number of location anchor transceivers 276, 278 connected to a location manager module 252.

It may be noted that not all location anchor transceivers 276, 278 may be connected to the location manager module 252. Some of the location anchor transceivers 276, 278 may be used only to provide probe responses for location purposes but are not used to relay information to the location manager module 252.

The location anchor transceivers 276, 278 that are connected to the location manager module 252 may wirelessly receive gas readings and location information from the portable gas detectors 256. The location anchor transceivers may forward this information to the location manager. The location manager module 252 uses this information primarily to notify a central human operator of the occurrence and location of gas detection events. The location manager module 252 may also use the gas readings and location information to create a gas concentration profile across a predetermined area 904.

Also located within the area 904 is a number of enhanced location anchor transceivers 900, 902. The enhanced location anchor transceivers 900, 902 operate together with the location anchor transceivers 276, 278 primarily to monitor the accuracy of position estimates of the portable gas detectors 256. The enhanced location anchor transceivers 900, 902 may also operate together with the location anchor transceivers 276, 278 to provide location information via measurement made by the portable gas detector 256 that are sent to the location manager to facilitate the estimate of the position of the portable gas detectors 256.

The gas detectors 256, location anchor transceivers 276, 278 and enhanced location anchor transceivers 900, 902 operate to wirelessly exchange information under an appropriate wireless format (e.g., IEEE 802.11). At least some of the location anchor transceivers 276, 278 may operate as wireless access points for the gas detectors 256 and enhanced location anchor transceivers 900, 902.

The location anchor detectors 276, 278 and enhanced location anchor detectors 900, 902 are disposed at known locations within the area 904. The location manager module 252 uses the known locations of the location anchor detectors 276, 278 and enhanced location anchor detectors 900, 902 in conjunction with location information provided by the gas detectors 256 to estimate the location of the portable gas detectors 256. The location manager may also operate by collecting, logging and displaying the estimated locations of the portable devices.

The portable gas detectors 256 may be worn by personnel moving about the area 904. As the person wearing the portable gas detector 256 moves from location to location within the area 904, the gas detector 256 may periodically measure a gas concentration at those locations. The gas detector 256 may combine the gas measurements with location information into a measurement packet and wirelessly transmit the packet to the location manager module 252 through a location anchor transceiver 276, 278 that supports an access point function.

The location information collected by the gas detectors 256 may be parameters of signals transmitted by the location anchor transceivers 276, 278 and enhanced location anchor transceivers 900, 902 and measured (or derived from probe responses (e.g., MAC address)) by the gas detectors 256. In order to collect location information and to transmit a gas measurement to the location manager module 252, the gas detector 256 may first transmit a probe request as a first step in soliciting responses from the location anchor transceivers 276, 278 and enhanced location anchor transceivers 900, 902.

Any location anchor transceiver 276, 278 and enhanced location anchor transceiver 900, 902 that detects the probe request from the portable gas detector 256 may transmit a probe response. The portable gas detector 256 measures a signal parameter of a probe response received from any location anchor transceiver 276, 278 and enhanced location anchor transceiver 900, 902 that transmits a probe response.

The signal parameter measured by the portable gas detector 256 may be any appropriate indicator of distance (e.g., received signal strength indicator (RSSI), time of flight, etc.). Based upon the measured signal parameters, the portable gas detector 256 may select one of the location anchor transceivers 276, 278 as an access point to associate and send data. The portable gas detector 256 may select the location anchor transceiver 276, 278 with the best measured signal parameter of the probe response (e.g., the greatest relative RSSI if RSSI is used, the shortest relative time-of-flight if time-of-flight is used, etc.).

Once a location anchor transceiver 276, 278 is selected, the portable gas detector 256 composes a packet for transmission to the location manager module 252 through the selected access point 276, 278. In this case, the composed packet includes at least three portions. The first and second portions include the system identifier of the portable gas detector and the gas measurement. The third portion includes the measured signal parameters and system identifier of any location anchor transceiver 276, 278 and enhanced location anchor transceiver 900, 902 that provided a probe response.

Once the packet has been composed and an access point has been selected, the portable gas detector 256 transmits the packet to the selected access point 276, 278. The selected access point, in turn, forwards the transmitted packet to the location manager module 252.

Upon receipt of the packet, the location manager module 252 saves the gas measurement of the packet and attempts to determine a location of the portable gas detector 256. In order to determine the location of the portable gas detector 256, the location manager module 252 transfers the signal parameter measurements to a location engine 268.

The location engine 268 estimates a location of the gas detector 256 based upon the signal measurements. If the signal measurement is based upon RSSI, then the assumption upon which the estimate is based is that the signal attenuates in a manner that is proportionate to distance. By knowing the amplitude of the transmitted signal and amplitude measured by the gas detector 256, the location engine can calculate a distance from the gas detector 256 to each of the location anchor transceivers 276, 278 and to each enhanced location anchor transceivers 900, 902. By knowing the distance from the portable gas detector 256 to each of the location anchor transceivers 276, 278 and enhanced location anchor transceivers 900, 902, the location engine 268 triangulates the position of the gas detector 256 by determining the intersection of the distances from each of the location anchor transceivers 276, 278 and enhanced location anchor transceivers 900, 902 to the gas detector 256.

If the signal measurement is based upon time of flight, then a similar process is used. In this case, the location engine 268 determines distance based upon the time of flight of the signal from the gas detector 256 to each of the location anchor transceivers 276, 278 and enhanced location anchor transceivers 900, 902 and triangulates in the same manner.

At least some of the enhanced location anchor transceivers 900, 902 may also include gas detectors 906, 908. Since some the enhanced location anchor transceivers 900, 902 include gas concentration detectors, the enhanced location anchor transceivers 900, 902 may also periodically measure a local gas concentration and report the measured local gas concentration to the location manager module 252.

In this regard, the enhanced location anchor transceivers 900, 902 with gas detectors may operate in a manner that is similar to the portable gas detector 256. In the case where the enhanced location anchor transceivers 900, 902 do not include gas detectors the enhanced location anchor transceivers 900, 902 would operate in a manner that is similar to the portable gas detector 256 except that they would not include gas measurements in their transmissions. In either case and in order to transmit location information to the location manager module 252, each of the enhanced location anchor transceivers (e.g., enhanced location anchor 900) may first transmit a probe request.

In a similar manner any other enhanced location anchor (e.g., enhanced location anchor 902) and location anchors 276, 278 that receive the probe request will respond by transmitting a probe response that includes the device identifier of the transmitting unit 276, 278, 902. The enhanced location anchor 902 receives the probe responses and measures a signal parameter of the probe response from each of the enhanced location anchor transceivers 902 and location anchor transceivers 276, 278. The enhanced location anchor transceiver 900 may transmit a gas measurement in the same manner as the gas detector 256.

In this regard, the enhanced location anchor 902 selects a location anchor 276, 278 as an access point for transmitting packets to the location manager module 252. Next the enhanced location anchor transceiver 902 composes a gas measurement packet including the gas concentration measurement and the measured signal parameter of each of the enhanced location anchor transceivers 902 and location anchor transceivers 276, 278. The enhanced location anchor 900 then transmits the gas measurement packet to the location manager module 252 through the selected access point 276, 278.

The location manager module 252 receives the gas measurement packet from the enhanced location anchor transceiver 900 and saves the gas measurement in the data base. The location manager module 252 also sends the measured signal parameter of each responding enhanced location anchor transceivers 902 and location anchor transceivers 276, 278 (and system identifiers) to the location engine 268.

Upon receiving the measured signal parameters, the location engine 268 calculates an estimated location of the enhanced location anchor transceiver 900. The location engine 268 then compares the estimated location of the enhanced location anchor transceiver 900 with the known location of the enhanced location anchor transceiver 900 to obtain a location error measurement or value.

The location error measurement or value may be monitored over a period of time to detect a gradual or rapid degradation of location accuracy. Once the degradation exceeds some threshold value, a human operator of the system may be notified and/or an event may be recorded.

This gas measurement and reporting processes may be performed by each of the enhanced location anchor transceivers 900, 902. In doing so, the location engine 268 obtains a location error measurement value for each of the enhanced location anchor transceivers 900, 902. The detection of accuracy changes by the location manager may also include detecting a group of degraded errors in a certain area and notifying the human operator of the area where degradation is occurring.

The location error measurements may be used as a correction factor to correct the estimated locations of the portable gas detectors 256. For example, if a portable gas detector 256 should provide a signal parameter measurement of a location anchor transceiver (e.g., location anchor transceiver 276) that has the same value as a signal parameter measurement of an enhanced location anchor transceiver (e.g., enhanced location anchor transceiver 900), then the location engine 268 may impose a correction factor to the estimated location of the gas detector that places the gas detector 256 at the same distance from the location anchor transceiver 276 as is the enhanced location anchor transceiver 900 (including an adjustment for the location error measurement). Further, the location engine may adjust its location estimate for a portable gas detector device taking into consideration the location errors for several neighboring enhanced location anchor transceivers. The error for the most proximate enhanced location anchor may provide the most influence on the estimate. Other correction factors may be applied based upon whether the measured parameter is greater or smaller.

The location errors may also be compared with a location error threshold value. In this case, if the location error exceeds the threshold value, then a user of the system 250 may be alerted to the possibility of a failure in the system 250. Such a failure could be due to environmental changes such as the construction of a metal structure in the area or due to signal degradation of one or more of the enhanced location anchor transceivers 900, 902 or location anchor transceivers 276, 278.

The location manager module 252 may also be provided with a display 910 that depicts a map 912 of the area 904. Included on the map may be a designated location of each of the location anchor transceivers 276, 278, the enhanced location anchor transceivers 900, 902 and the portable gas detectors 256.

Shown on the display 910 around the location 914 of the portable gas detector 256 may be a bounding box 916 that indicates the estimated location error of the portable gas detector 256. For example, if the location error of the enhanced location anchor transceivers 900, 902 closest to the estimated location of the gas detector transceiver 256 indicate an error of 10 feet, then the bounding box 916 may be shown around the portable gas detector 256 with sides having at least a length of 10 feet. Since the error is a vector including x and y components, it is also possible to have a bounding rectangle 916 in which the length of sides are at least the corresponding x and y amounts. However, the bounding box 916 may not be exactly the size of the error measurements as there may be other sources of error that should be considered and that may suggest that the box 916 be larger. Further, rather than a rectangle, the error may be indicated as an area surrounding the estimated location where the shape and size of the area may be proportional to the error vector.

A specific embodiment of an environmental monitoring system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:
    providing a plurality of location anchor transceivers and a plurality of enhanced location anchor transceivers operating from respective predetermined locations within a region at least some of the enhanced anchor transceivers including a respective gas detector;
    a portable transceiver within the region detecting and measuring a signal parameter of a signal from at least some of the plurality of location anchor transceivers and enhanced location anchor transceivers, the portable transceiver including a gas detector;
    the gas detectors of the portable transceiver and at least some enhanced location anchor transceivers measuring and reporting a gas concentration to a location manager module;
    a location engine of the location manager module calculating an estimated location of the portable transceiver based upon the signal measurements of the portable transceiver and the respective predetermined locations of the plurality of location anchor transceivers and enhanced location anchor transceivers;
    at least some of the plurality of enhanced location anchor transceivers detecting and measuring a signal parameter of a signal from at least some of the plurality of location anchor transceivers and other enhanced location anchor transceivers;
    the location engine calculating an estimated location of the at least some of the plurality of enhanced location anchor transceivers based upon the signal measurements of the at least some of the enhanced location anchor transceivers and the respective predetermined locations of the plurality of location anchor transceivers and enhanced location anchor transceivers;
    calculating a location error for the portable transceiver and each of the at least some of the plurality of enhanced location anchor transceivers based upon the estimated location and predetermined location of the enhanced location anchor transceiver; and
    a display of the location manager module depicting a map of the region including a designated location of at least some of the plurality of enhanced location anchor transceivers, an estimated location of the portable transceiver, a gas concentration profile across the region and a location error of the portable transceiver.

2. The method as in claim 1 further comprising the portable transceiver and at least some of the plurality of enhanced location anchor transceivers transmitting a probe request requesting a response from any location anchor transceiver and enhanced location transceiver of the plurality of enhanced location anchor transceivers and location anchor transceivers detecting the probe request.

3. The method as in claim 1 further comprising defining the measured signal parameter by at least one of the portable transceiver and at least some enhanced location anchor transceivers as a received signal strength indication.

4. The method as in claim 1 further comprising displaying to a user an estimated error of the estimated location of the portable transceiver based upon the calculated location error of at least some of the plurality of enhanced location anchor transceivers that are nearest the estimated location of the portable transceiver.

5. The method as in claim 4 wherein the step of displaying the estimated error of the calculated location of the portable transceiver further comprises providing a bounding box around the estimated location of the portable transceiver with the length of the sides of the bounding box being a function of the calculated location errors of at least some of the plurality of enhanced location anchor transceivers nearest the portable transceiver.

6. The method as in claim 1 further comprising generating an alert upon detecting that one of the calculated location errors of the plurality of enhanced location anchor transceivers exceeds a threshold.

7. The method as in claim 1 further comprising the location engine adjusting the estimated location for the portable transceiver based on the location errors for at least some of the plurality of enhanced location anchor transceiver located nearby the estimated location for the portable transceiver.

8. A system for reporting the location of a wireless device, said system comprising:
  a plurality of wireless devices including at least some portable devices, the at least some portable devices each including a respective gas detector, the plurality of wireless devices also including at least some stationary devices, the stationary devices including one or more respective gas detectors, the at least some stationary devices operating from respective predetermined locations, the at least some portable devices and the at least some stationary devices with gas detectors measuring and reporting a gas concentration to a location manager module;
  at least one wireless transceiver of the at least some portable devices that wirelessly measures a signal parameter each of at least some of the stationary wireless devices and wirelessly communicates information including at least the measured signal parameter;
  at least one wireless transceiver of the at least some stationary devices that each wirelessly measures a signal parameter of at least some other of the stationary wireless devices and wirelessly communicates information including at least the measured signal parameter;
  at least one transceiver of the plurality of stationary wireless devices that wirelessly communicates with the wireless transceiver of each of the at least some portable devices and also the wireless transceiver of the at least some other of the stationary wireless devices to receive said information including the measured signal parameters;
  at least one location engine of the location manager module that calculates an estimated location of each of the at least some stationary wireless devices based on said predetermined locations and the signal parameter measured by the wireless transceiver of the at least some stationary wireless devices, said at least one location engine further calculates a location error based on the estimated location and the respective predetermined locations, the said at least one location engine further receives the signal parameter measured by the wireless transceiver of the at least some portable devices and calculates an estimated location of each of said at least some portable devices based on said predetermined locations and the signal parameter measured by the at least some portable devices; and
  the location manager module collects, logs and displays a gas concentration profile based upon the reported gas concentrations across a predetermined area along with said estimated locations of said at least some portable devices shown within the predetermined area.

9. The system as in claim 8 wherein the measured signal parameter of the plurality of wireless devices further comprises a received signal strength indication.

10. The system as in claim 8 wherein the measured signal parameter of the plurality of wireless devices further comprises a time of flight.

11. The system as in claim 8 wherein the at least one portable device further comprises a gas detection device.

12. A system comprising:
  a plurality of location anchor transceivers within a region that each operate from respective predetermined locations;
  a plurality of enhanced location anchor transceivers within the region that each operate from different respective predetermined locations and that each measure a signal parameter of a signal from at least some of the plurality of location anchor transceivers and other enhanced location anchor transceivers at least some of the plurality of enhanced location anchor transceiver including a respective gas detector that measures and reports a gas concentration to a location manager module;
  a location engine of the manager module that receives the measured signal parameters from at least some of the plurality of enhanced location anchor transceivers along with an identifier of the enhanced location anchor transceiver and an identifier of a source of each of the measured signal parameters;
  the location engine further calculates an estimated location for the at least some of the plurality of enhanced location anchor transceivers from the measured signal parameters, the location engine calculates a location error for the at least some of the plurality of enhanced location anchor transceivers based upon the estimated location and predetermined location of the enhanced location anchor transceiver;
  a portable transceiver within the region that detects and reports a gas concentration and that detects and measures a signal parameter of a signal from at least some of the plurality of location anchor transceivers and enhanced location anchor transceivers and wherein the location engine determines a location of the portable transceiver based upon the signal measurements of the portable transceiver, and the predetermined locations of the enhanced location anchor transceivers and location anchor transceivers; and
  a display of the location manager module that depicts a map of the region including a designated location of at least some of the plurality of enhanced location anchor transceivers, an estimated location of the portable transceiver, a gas concentration profile across the region based upon the reported gas concentrations and a location error of the portable transceiver.

13. The system as in claim 12 further comprising a probe request transmitted by the portable transceiver and by at least some of the enhanced location and anchor transceivers, the probe request requesting a response from any location anchor transceiver and enhanced location transceiver of the plurality of enhanced location anchor transceivers and location anchor transceivers detecting the probe.

14. The system as in claim 12 where the measured signal parameters further comprise a received signal strength indication.

15. The system as in claim 12 further comprising a display that displays to a user an estimated error of the calculated location of the portable transceiver based upon the calculated location errors of the plurality of enhanced location anchor transceivers.

16. The system as in claim 12 further comprises a bounding area provided around the calculated location of the portable transceiver with size of the bounding area directly proportional to the calculated location error of at least some of the plurality of enhanced location anchor transceivers.

17. The system as in claim 12 further comprising an alert provided to a user upon detecting that one of the calculated location errors of the plurality of enhanced location anchor transceivers exceeds a threshold.

* * * * *

UNITED STATES PATENT AND TRADEMARK OFFICE
CERTIFICATE OF CORRECTION

| | | |
|---|---|---|
| PATENT NO. | : 8,442,801 B2 | Page 1 of 1 |
| APPLICATION NO. | : 12/959250 | |
| DATED | : May 14, 2013 | |
| INVENTOR(S) | : Gonia et al. | |

It is certified that error appears in the above-identified patent and that said Letters Patent is hereby corrected as shown below:

On the Title Page Item [75]
Delete "Patrick S. Gonla" and insert -- Patrick S. Gonia --.

Signed and Sealed this
Twenty-first Day of October, 2014

Michelle K. Lee
*Deputy Director of the United States Patent and Trademark Office*